July 1, 1930.   H. L. KUTTER   1,769,374
BEARING
Filed Oct. 13, 1923   2 Sheets-Sheet 1

Witness
John W. Wright

Inventor
Herman L. Kutter
By
Attorney

July 1, 1930.　　　H. L. KUTTER　　　1,769,374
BEARING
Filed Oct. 13, 1923　　2 Sheets-Sheet 2
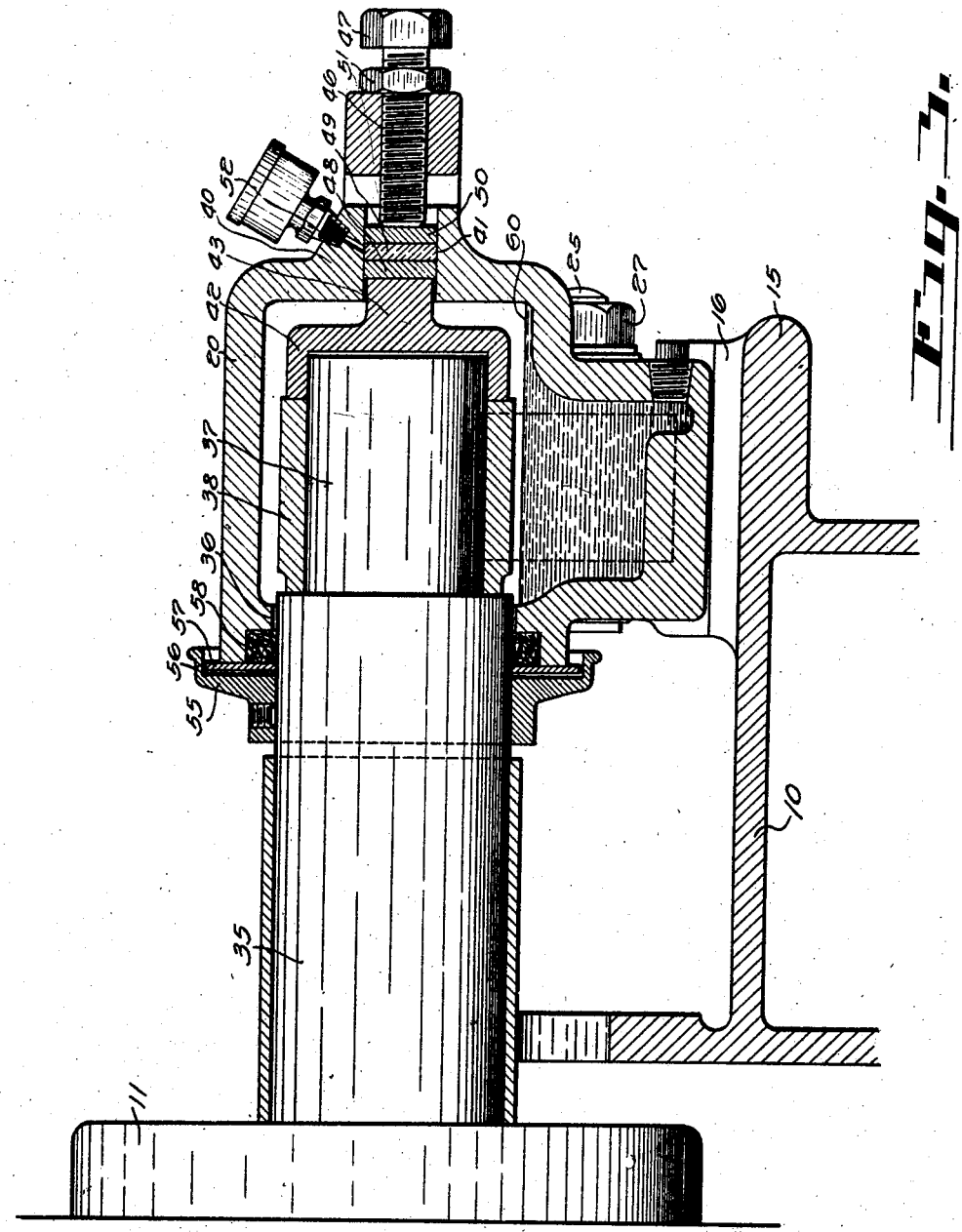

Patented July 1, 1930

1,769,374

UNITED STATES PATENT OFFICE

HERMAN L. KUTTER, OF HAMILTON, OHIO, ASSIGNOR TO THE BLACK-CLAWSON COMPANY, OF HAMILTON, OHIO, A CORPORATION OF OHIO

BEARING

Application filed October 13, 1923. Serial No. 668,351.

This invention relates to bearings, and more particularly to a type of self aligning roller bearing.

One of the principal objects of the invention is to provide an improved form of roller bearing which is self aligning and is provided with means for taking up thrust.

Another object of the invention is to provide a bearing of this character which is particularly adapted for use in connection with cylinder molds, such as form a part of certain types of paper making machinery.

Another object of the invention is to provide a mechanism of this character which is simple in design, which may be cheaply constructed, which will not easily get out of repair, but which may be readily repaired if occasion arises.

Other objects and advantages of the invention will be apparent from the description set out below when taken in connection with the accompanying drawing.

In the drawing, in which like characters of reference designate like parts throughout the several views thereof, Fig. 1 is a plan view of a form of bearing constructed in accordance with this invention;

Fig. 3 is a vertical sectional view along the line 3—3 of Fig. 1;

Figure 1:
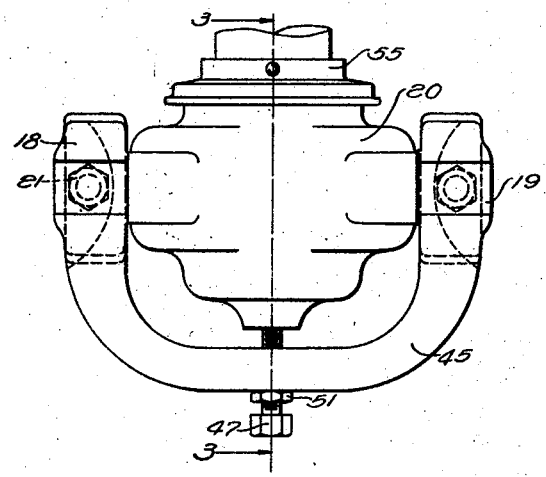
Figures 2, 4:
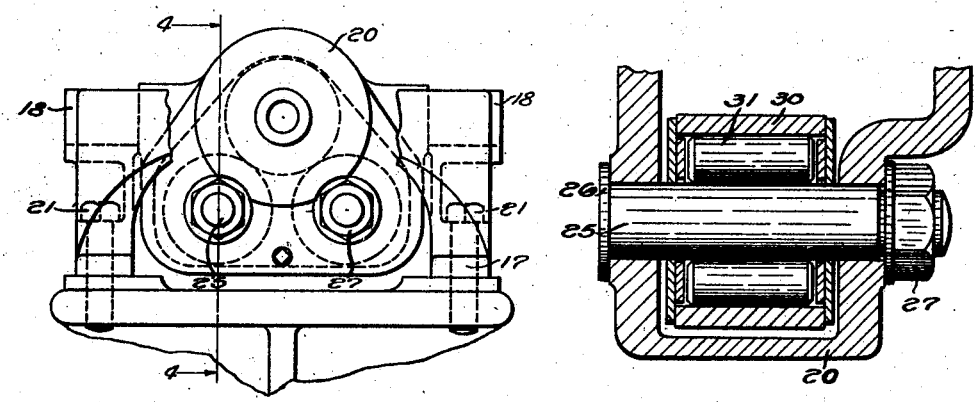
Fig. 2 is a front elevation of the form of apparatus shown in Fig. 1, with certain parts thereof broken away to more clearly disclose the invention.
Fig. 4 is a fragmentary, vertical, sectional view through one of the individual roller bearings which constitutes an element of this invention, the section being along the line 4—4 of Fig. 2.

While the apparatus which is disclosed in the drawing, as constituting a preferred embodiment of the invention, is of general application, it is primarily designed for use in connection with that type of paper-making apparatus which is generally designated in the art by the term cylinder mold.

A cylinder mold consists of a cylindrical roll of large diameter and of a varying length depending upon the use to which it is to be put, which comprises a light skeleton framework about which is wound a surface of fine mesh wire screen, the whole roll being mounted upon a centrally arranged shaft, with the opposite ends sustained in bearings which are carried by the walls of a tank, within which the cylinder mold revolves. Each of these cylinder molds is driven by means of a felt belt which carries a sheet of paper, being manufactured, which belt rides upon the cylinder mold and drives it. That is, there is no positive driving of the cylinder mold, and because of the character of the felt belt it is evident that the forces which are available for causing its rotation are quite slight.

As shown in the drawing, the tank is designated generally by the numeral 10, and the cylinder mold, only one end of which is shown, is designated generally by the numeral 11. Only one end of the cylinder mold and tank, and associated parts, are shown and described, since the two ends are substantially identical in construction, there being only such minor incidental changes in construction as may be made necessary because of the two opposite ends being right and left hand ends respectively.

As a general practice, the ends of the tank 10 are of metal, while the side walls are of wood, the ends being fastened in place in any suitable manner. And the end of the tank, as shown in the drawing, is constructed to form a platform which is designated generally by the numeral 15, which platform carries a stand 16.

Figure 5:
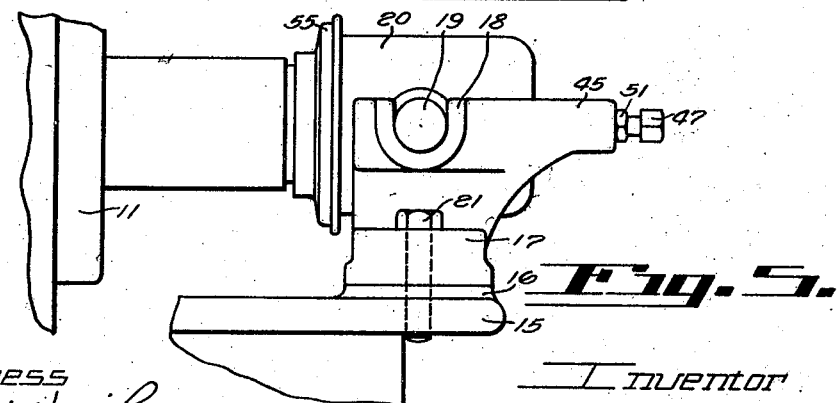
Fig. 5 is an elevation view at right angles to Fig. 2.

Extending upwardly from opposite sides of the stand 16 are two standards 17, the upper end 18 of each of which is bifurcated, to form a socket which is constructed to receive an extension or trunnion 19, carried by the bearing housing 20. The stand 16 is attached to the platform 15 in any desired manner, but preferably by means of bolts 21, the standards 17 being cut away, as shown most clearly in Fig. 5, to receive these bolts.

Mounted within aligned passages in the bearing housing 20 are two pins 25, each of which carries at one end a suitable head 26 and has upon the opposite threaded end a suitable nut 27 through manipulation of which each pin may be firmly locked in position. Each of these pins serves as the inner member of a roller bearing, there being associated with each of these pins an outer cylindrical roller sleeve 30 and a plurality of rollers 31, which are positioned between each of the pins 25 and its respective cooperating roller sleeve 30. This sleeve is adapted to directly sustain a revolving load. Any suitable type of roller may be used, although the type shown in the drawing is preferable. Each of the pins 25 is made of suitable steel so that it will stand up during operation, while each of the roller sleeves 30 is made of extra thickness, and of suitable steel, so that it will function to sustain the load. A very simple roller bearing is thus secured which may be readily, and completely disassembled, by removing the nut 27 and withdrawing the pin 25 from within the aligned passages within the bearing housing, in which it is mounted. For purposes of description, the roller bearings and the supporting bearing housing 20 are termed bearing elements.

The cylinder mold, as stated above, is mounted upon a centrally arranged shaft, each extended end 35 of which is constructed to cooperate with the roller bearings which support the cylinder mold in proper position. One end of the bearing housing 20 is provided with a passage 36, through which the extended end of the shaft projects into the interior of the bearing housing. That part of the end of the shaft which operates with the two roller bearings is preferably cut away, as shown by the numeral 37, to receive a sleeve 38, which is of suitable steel. This sleeve is preferably pressed on to the cut away portion of the shaft, and is of such material that it will ride upon the outer sleeves 30 of the two roller bearings to support the weight of the cylinder mold without undue wear. Of course the sleeve 38 may be dispensed with and the shaft itself be so treated as to cooperate directly with the two roller bearings.

The opposite end of the bearing housing, from that which contains the passage 36, is provided with a hub or extension 40, within which is the passage 41. This passage is of less diameter than, but is coaxial with, the passage 36. Mounted upon the reduced portion 37 of the shaft is a cap 42, which is provided with an extension 43 which, when the device is in assembled position, extends into the passage 41. This extension 43 is of less diameter than the passage 41, and consequently permits of automatic alignment of the shaft 35, as such alignment becomes necessary because of variations in expansion or contraction of the various parts, variations in the setting of the wood walls of the trough due to swelling or shrinking, and because of inaccuracy in the machining of the various parts, and the like. This cap may be dispensed with if desired and an extension formed directly on the shaft itself; but the cap is desirable since it serves to prevent the sleeve 37 from sliding off the shaft in case it should, for any cause, become loose.

Attached to the two standards 17 is a substantially semi-circular shaped arm 45, which partly surrounds the bearing housing 20, and extends across the passage 41. This arm is provided with a passage 46, which is substantially coaxial with the passage 41 in the hub of the bearing housing 20. Threadedly mounted within this passage 46 is a bolt 47, which cooperates with the extension 43 and serves as a thrust receiving member, to take up the end thrust upon the shaft 35. This thrust bolt, as clearly shown by the drawing, is of materially less diameter than the passage 41, so that the housing 20 may swing freely upon its supporting members 19, to effect, automatically, proper alignment of the shaft with the supporting roller sleeves. Preferably several washers or wear plates are interposed between the extension 43 and the cooperating end of the thrust member 47. As shown two metallic plates or washers are provided, one of which, the one designated by the numeral 48, is of steel, while the other, the one designated by the numeral 49, is of brass or similar material. A third washer plate is also preferably interposed which, designated by the numeral 50, is preferably of leather and serves, primarily, as a packing. It is not necessary that these various washers be used, although it is desirable. During ordinary operation a roller of the character described, namely, one substantially 42 inches in diameter, will rotate about twenty times a minute, and therefore the wear due to thrust is comparatively small. However, it is advisable that wear plates of this character be used. By means of this described arrangement full bearing contact is insured between the roller sleeves 30 and the wear surface of the shaft 37, due to the trunnion mounting of the housing 20 and the independent mounting of the thrust bolt 47. And so the bearing automatically aligns itself, and the thrust may be varied independent of such alignment.

A lock nut 51 is provided for maintaining the thrust member 47 in adjustment. A passage 52 for receiving a lubricator is also provided.

Because of its location during use there is a tendency for water to work into the bearing, which of course would cause considerable damage. In order to prevent this a sleeve 55 is secured to the shaft 35 so that it will rotate with that shaft. This sleeve is provided with an overhung flange 56, which extends and overhangs the cooperating end of the bearing housing 20. A collar 57, which is attached to the bearing housing 20 by means of suitable bolts is also provided, which collar is of greater outside diameter than the cooperating end of the bearing housing. Any water falling upon the sleeve 55 would tend to be thrown off from that flange due to its rotation, but if water should drop from this flange upon the bearing housing then it would fall in such place that the collar 57 would prevent its passage into the bearing housing. As a further precaution the packing 58 is provided.

During operation the bearing housing is filled with oil up to substantially the level indicated by the numeral 60. Both of the roller bearings thus run in a bath of oil, and, of course, the sleeve 38 will also have its surface continuously coated with oil as a result of its contact with the surfaces of the sleeves 30.

While the form of apparatus illustrated herein constitutes a preferred embodiment of the invention, it is to be understood that the invention is not limited to this precise form, and that changes may be made therein without departing from the scope of the invention which is defined in the appended claims.

What is claimed is:

1. A cylinder mold bearing of the character described, comprising a self-aligning roller bearing constructed to receive the cylinder mold shaft in maintained adjustment, and an adjustable bolt supported independently of the bearing elements for taking up the end thrust of the shaft without affecting the setting of the bearing and shaft supported thereby.

2. In a cylinder mold, a shaft carrying the cylinder mold, an extension on said shaft, a self-aligning housing for the said shaft extension, a plurality of roller bearings fixedly but rotatably mounted in said housing for sustaining said shaft extension, said roller bearings extending about only a portion of the periphery of said shaft, and means supported independently of the roller bearings and housing for receiving the end thrust of said shaft.

3. In a cylinder mold, a shaft carrying the cylinder mold, an extension on said shaft, a self-aligning housing for said shaft extension, roller bearings of large diameter journalled in said housing for rotation therein, said shaft extension resting upon and being rotatably supported by said roller bearings, and means supported independently of said housing and said roller bearings for receiving the end thrust of said shaft.

4. Cylinder mold apparatus of the character described, comprising a tank, a cylinder mold mounted on a shaft, a stand mounted on the end of said tank, a self-aligning roller bearing carried by said stand and constructed to support the end of the shaft, and an adjusting bolt supported on said stand independently of said bearing to receive the end thrust of the shaft.

5. In a cylinder mold, a shaft carrying the cylinder mold, an extension on said shaft, a sleeve carried by said extension, a self-aligning housing, fixed pins mounted in the lower part of said housing, roller bearings of large diameter rotatably mounted on said fixed pins, said lower part of the housing constituting an oil reservoir within which said roller bearings rotate, the upper part of one end of said housing having an opening through which said shaft extension is received with said sleeve rotatably supported on said roller bearings, the other end of said housing having an opening in alignment with said shaft end, and an adjustable bolt supported independently of said housing and roller bearings and extending through said other opening to receive the end thrust of said shaft.

6. A cylinder mold bearing comprising a housing, a removable pin mounted in said housing and accessible from outside the said housing for removal, a roller bearing sleeve surrounding said pin and adapted to receive in rolling engagement the shaft of the cylinder mold, and a plurality of rollers loosely positioned between the said pin and the said roller sleeve and contacting directly therewith.

7. A bearing of the character described comprising a housing, a plurality of laterally spaced pins removably mounted in said housing and accessible from outside the said housing for removal, each of which constitutes the inner member of a roller bearing, an outer roller bearing sleeve associated with each of said pins, and adapted to sustain a revolving load, and a plurality of elongated rollers loosely positioned between and contacting directly with each of said pins and its associated roller bearing sleeve.

8. In apparatus of the character described, comprising a tank, a cylinder mold mounted on a shaft; a stand affixed to the end of the tank, a plurality of standards carried by said stand, each having its upper end bifurcated; a bearing housing having extensions thereon pivotally mounted in said bifurcations, a plurality of roller bearings mounted in said bearing housing; an extension on the cylinder mold shaft extending into the said bearing housing and constructed to cooperate with the said roller bearings, a thrust bearing member carried by said shaft and constructed to extend into an opening within the said bearing housing, an arm carried by said stand, and an adjustable thrust receiving member carried by said arm and constructed to extend into said opening to contact with the said thrust bearing member.

9. Apparatus of the character described comprising the combination with a tank, a cylinder mold within said tank mounted on a shaft, a stand associated with said tank, a bearing housing pivotally mounted on said stand, roller bearings fixedly and rotatably mounted within said housing supporting the said shaft, the construction being such that the housing will automatically move upon its pivotal supports to effect alignment of the shaft and the roller bearings, and means carried by said stand and independent of said roller bearings and said housing for taking up the end thrust of said shaft, said thrust means being constructed to permit of variation in alignment of the shaft.

10. Apparatus of the character described comprising a shaft, a pivotally mounted housing having side and end walls and forming a lubricant reservoir, a plurality of roller bearings within said housing for sustaining said shaft adapted to operate within lubricant in said reservoir, said housing having an opening in one end wall for receiving said shaft, and a bore in the other end wall thereof in alignment with said shaft, said shaft having a hub of less diameter than said bore extending within said bore, to permit relative movement of said shaft and housing to effect alignment of said shaft and roller bearings, and means supported independently of said roller bearings and said housing and associated with said hub for receiving the end-thrust of said shaft, whereby end-thrust strains are carried by said independent means and are not imposed upon said roller bearings and said housing.

11. Cylinder mold apparatus of the character described, comprising a tank, a cylinder mold mounted on a shaft, a stand mounted on the end of said tank, a self-aligning housing carried by said stand, roller bearings within said housing for supporting the end of the shaft, said housing having an opening through which said shaft end extends, a sleeve carried by said shaft having a flange overlying the end of the housing adjacent said opening, and a collar having a diameter greater than the adjacent end of the housing carried by said housing and positioned within said overhung flange, to thereby prevent the ingress of water into said housing.

12. In apparatus of the character described, a stand, a self-aligning housing carried by said stand, said housing having side and end walls forming a confining casing and providing a lubricant reservoir, spaced rollers mounted within said housing and providing a support for a shaft end, said housing having an opening in one end wall thereof, the central axis of said opening being above the longitudinally axes of said rollers, a shaft end extending within said opening and supported upon said rollers, said housing having a second opening in the opposite end wall thereof in alignment with said shaft end, and adjustable means supported independently of said housing and rollers extending within said second opening and contacting with said shaft end, said means being capable of adjustment axially of said shaft to take up end play in the said shaft.

In testimony whereof I hereto affix my signature.

HERMAN L. KUTTER.